United States Patent [19]

Yasuda et al.

[11] Patent Number: 4,681,904

[45] Date of Patent: Jul. 21, 1987

[54] EPOXY RESIN COMPOSITION

[75] Inventors: Kazuo Yasuda; Toshiharu Ando; Yoshifumi Itabashi; Masaru Tsuchihashi, all of Hyogo, Japan

[73] Assignee: Mitsubishi Denki Kabushiki Kaisha, Tokyo, Japan

[21] Appl. No.: 843,754

[22] Filed: Mar. 25, 1986

[30] Foreign Application Priority Data

Apr. 10, 1985 [JP] Japan .................................. 60-74355

[51] Int. Cl.[4] ...................... C08G 59/06; C08G 59/42; C08L 63/02
[52] U.S. Cl. .................................... 523/457; 525/438; 525/524
[58] Field of Search ................. 525/524, 438; 523/457

[56] References Cited

U.S. PATENT DOCUMENTS

| | | | |
|---|---|---|---|
| 2,735,829 | 2/1956 | Wiles et al. | 525/524 |
| 3,352,809 | 11/1967 | Carlyle et al. | 525/524 X |
| 3,395,118 | 7/1968 | Reinking et al. | 525/524 X |
| 3,424,707 | 1/1969 | Schaufelberger | 525/524 X |
| 3,873,637 | 3/1975 | Fujiwara et al. | 525/524 |
| 4,309,473 | 1/1982 | Minamisawa et al. | 525/524 X |
| 4,591,623 | 5/1986 | Nakajima et al. | 525/524 |

Primary Examiner—Earl Nielsen
Attorney, Agent, or Firm—Wolf, Greenfield & Sacks

[57] ABSTRACT

A novel epoxy resin composition is prepared by first mixing 100 parts by weight of an epoxy resin having an epoxy equivalent of no more than 200 with 0.5–10 parts by weight of a phenoxy resin to form a uniform mixture, then blending the mixture with a curing agent (i.e., a condensation product of a polybasic carboxylic acid and bisphenol A) and an inorganic filler. The epoxy resin composition has a suitable degree of rigidity and softness within the molecular chain without sacrificing its resistance to heat or thermal shock and will not cause precipitation of any portion of the filler in the resin composition. This resin composition is useful in the making of cast insulators employed in electric machines.

2 Claims, 1 Drawing Figure

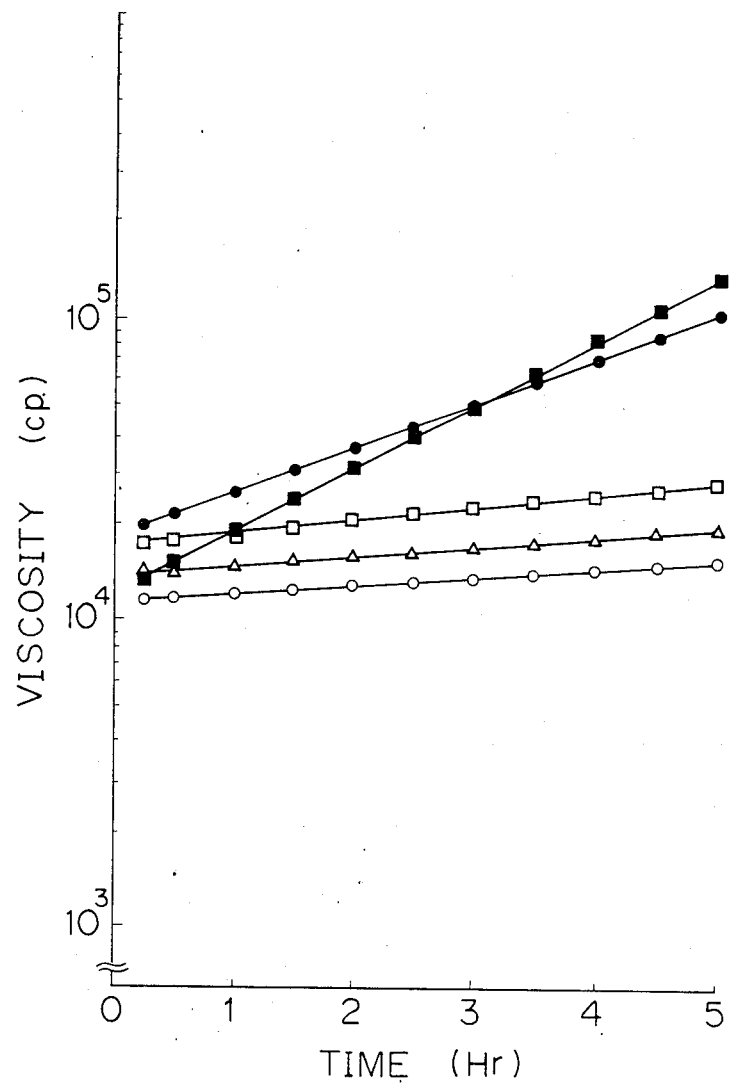

EPOXY RESIN COMPOSITION

BACKGROUND OF THE INVENTION

The present invention relates to an epoxy resin composition useful in the making of cast insulators employed in electric machines.

An epoxy resin combined with an acid anhydride cures to provide a product that has superior electrical, mechanical and chemical properties and which is extensively used as an epoxy resin cast insulator in electric machines including those employed in power transmission and distribution. In order to improve the productivity of epoxy resin cast insulators using a smaller number of molds, a method commonly referred to as the superatmospheric gelling process which is capable of reducing the release time is currently employed. In this method, an epoxy resin blend of interest held within a cold pressurized tank is injected into a heated mold through a pipeline and a die head, while the mold is pressurized to compensate for any contraction of the resin being cured, thereby producing the desired casting within a shortened period of curing. The epoxy resin blend employed in this method must have a low viscosity and a long pot life within the cold pressurized tank, and must be capable of curing rapidly within the heated mold.

Those epoxy resins which exhibit low viscosities at low temperatures have low molecular weights and, hence, they exhibit an extremely high degree of shrinkage during curing and are highly likely to give cured products with sink marks and cracks. In addition, epoxy resins that are highly reactive at elevated temperatures will also exhibit comparatively high reactivity at low temperatures and suffer from a shorter pot life.

Common practice for dealing with these problems is to employ the superatmospheric gelling method with a view to preventing the occurrence of sink marks and cracks during the curing process and to use a latent accelerator for the purpose of extending the pot life of the resin blend.

A problem arises, however, from the fact that epoxy resins of low molecular weights that will exhibit low viscosities at low temperatures are less resistant to thermal shock than the solid or high-viscosity epoxy resins which are commonly employed in ordinary casting methods other than the superatmospheric gelling process. Conventionally, the thermal shock resistance of low-viscosity epoxy resins is improved by addition of plasticity providing agents, such as high-molecular weight oligomers that have molecular weights within the range of from about 500 to 5,000 and which are comprised of polyester, polyether, polybutadiene or the like in the backbone chain. However, as the addition of these oligomers is increased, the viscosity of the epoxy resin is increased significantly while its heat resistance is considerably reduced. On the other hand, if the addition of such oligomers is insufficient, there is little possibility of improvement in the resistance of the product against thermal shock. Plasticity providing agents such as those having polyamide in the backbone chain have the advantage that they will not substantially increase the viscosity of the resin blend but then, the resin blend incorporating such plasticity providing agent is highly reactive and has a shorter pot life.

In the superatmospheric gelling method, an epoxy resin blend having a low viscosity at low temperature is injected into a mold that is heated to a temperature higher than that of the resin blend. Within the mold, the viscosity of the resin blend is reduced temporarily to cause precipitation of the filler, giving rise to such problems as surface defects (e.g. flow marks) on the cured product and unevenness in the properties of the final product. These problems are particularly noticeable when the filler is an alumina powder having a comparatively high specific gravity.

As mentioned before, another disadvantage of the low-viscosity epoxy resin which is suitable for use in the superatmospheric gelling method is that it has poor resistance to heat shock and that its heat resistance has to be sacrificed in order to improve its heat shock resisting properties.

SUMMARY OF THE INVENTION

The primary object, therefore, of the present invention is to eliminate the aforementioned problems by providing a novel epoxy resin composition that has a suitable degree of rigidity and softness within the molecular chain without sacrificing its resistance to heat or thermal shock and which will not cause precipitation of any portion of the filler in the resin composition.

BRIEF DESCRIPTION OF THE DRAWING

The accompanying drawing is a diagram showing the time vs. viscosity profile of each of the epoxy resin compositions prepared in Examples 1 to 3 and Comparative Examples 1 and 2.

DETAILED DESCRIPTION OF THE INVENTION

The epoxy resin composition of the present invention comprises (1) an epoxy resin prepared by mixing under heating 100 parts (on a weight basis and all parts specified hereinafter are by weight of an epoxy resin having an epoxy equivalent of 200 or below with 0.5–10 parts of a phenoxy resin having Formula (I):

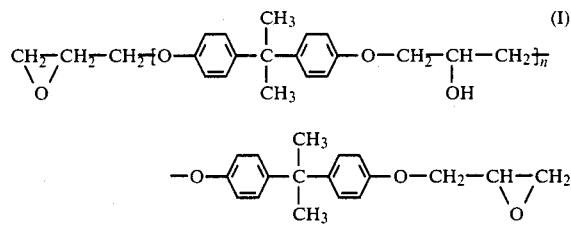

where n is approximately 100; (2) a curing agent; and (3) an inorganic filler.

The curing agent may be a condensation product of 100 parts of a polybasic carboxylic acid anhydride and 40–60 parts of bisphenol A having Formula (II):

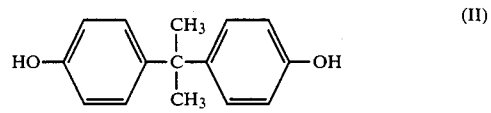

The epoxy resin for use in the present invention may be selected from among those which are liquid at low temperatures within the range of 20°–80° C., and those which will become liquid at such low temperatures when mixed with the curing agent, especially the condensation product specified above. Illustrative epoxy resins that meet one of these requirements include bisphenol A type epoxy resin, bisphenol F type epoxy resin, phenol novolak type epoxy resin, cresol novolak type epoxy resin, cycloaliphatic diglycidyl ester type epoxy resin, cycloaliphatic epoxy resin having an epoxy group in the ring, a spiro ring containing epoxy resin, and hydantoin epoxy resin. These epoxy resins may be used either independently or in combination.

The epoxy resin for use in the present invention may be prepared by the following procedure: an epoxy resin having an epoxy equivalent of no higher than 200 and a phenoxy resin of Formula (I) where n is approximately 100 are heated in a reactor at 110°–180° C. in a nitrogen gas atmosphere until the two reactants dissolve completely to form an intimate mixture. The phenoxy resin should be used in an amount of 0.5–10 parts for 100 parts of the epoxy resin having an epoxy equivalent of 200 or below. If the amount of the phenoxy resin added is less than 0.5 part for 100 parts of the epoxy resin, it is difficult to effectively prevent precipitation of the filler. If the amount of the phenoxy resin exceeds 10 parts for 100 parts of the epoxy resin, the mixture of the epoxy resin blend with the curing agent and the inorganic filler powder has a low-temperature viscosity that exceeds $10^5$ cp (cp stands for centipoises) and cannot be easily injected into the mold through a pipeline for the purpose of casting the blend by the superatmospheric gelling method. Suitable examples of the phenoxy that can be used in the present invention are PKHH and PKHG, both being the trade names of Union Carbide Corporation.

An example of the curing agent useful in the present invention is the condensation product of a polybasic carboxylic acid anhydride and a bisphenol A of Formula (II). This condensation product may be prepared by heating a polybasic carboxylic acid anhydride and bisphenol A of Formula (II) in a nitrogen-filled reactor at 100°–150° C. until they form a uniform liquid mixture. This reaction may be carried out in the presence of a metal salt of an organic carboxylic acid, a tertiary amine or any other suitable catalyst. Any polybasic carboxylic acid anhydride that is liquid at low temperatures within the range of 20°–80° C. may be employed as the component to react with bisphenol A of Formula (II); suitable examples are hexahydrophthalic acid anhydride, methylhexahydrophthalic acid anhydride, tetrahydrophthalic anhydride, and methyltetrahydrophthalic acid anhydride, and these may be used either independently or in combination.

In making the aforementioned condensation product, the bisphenol A of Formula (II) is used in an amount of 40–60 parts for 100 parts of the polybasic carboxylic acid anhydride. If the amount of the bisphenol A is less than 40 parts for 100 parts of the polybasic carboxylic acid anhydride, the cured resin blend will have an increased HDT (heat deformation temperature) but its resistance to thermal shock will be decreased. If the amount of the bisphenol A exceed 60 parts for 100 parts of the polybasic carboxylic acid anhydride, the mixture of the epoxy resin and the inorganic filler powder will have a low-temperature viscosity that exceeds $10^5$ cp and cannot be easily injected into the mold through a pipeline for the purpose of casting the blend by the superatmospheric gelling method. In addition, the cured resin blend has an undesirably low HDT.

Any inorganic powder material that will not deteriorate the electrical or mechanical properties of the blend may be used as a filler in the present invention. Suitable examples are alumina, hydrated alumina, quarts and fused quartz powders. One of the advantages of the resin composition of the present invention is that it effectively presents the precipitation of the filler and this advantage is particularly significant when the filler is an alumina powder having a high specific gravity.

The epoxy resin composition of the present invention may be prepared and cast by the following procedures: the epoxy resin having an epoxy equivalent of 200 or below and the phenoxy resin of Formula (I) where n is approximately 100 are heated until a uniform liquid mixture forms; this mixture is blended with the condensation product of a polybasic carboxylic acid anhydride and bisphenol A of Formula (II), the inorganic filler powder and a suitable accelerator at 20°–80° C., preferably under subatmospheric pressure, thereby making the epoxy resin composition; the composition then is injected directly into a preheated mold (90°–160° C.) through a pipeline; the mold is subsequently pressurized at 0.5–5.0 kg/cm$^2$G for 1–30 minutes until curing of the composition is completed to produce a casting.

The accelerator that may be incorporated in the epoxy resin composition is illustrated by, but by no means limited to, metal salts of organic carboxylic acids, tertiary amines, boron trifluoride amine complex, and imidazole. The amount of the accelerator added is to be adjusted to such a value that curing of the blend will be completed in 1–30 minutes at the mold temperature of 90°–160° C.

The epoxy resin composition offered by the present invention may also contain a colorant, a coupling agent or an internal release agent on the condition that they will not deteriorate any of the desirable characteristics such as the viscosity, long pot life, and fast curing property of the resin blend, as well as the resistance to precipitation of the filler, absence of color unevenness, high HDT and thermal shock resistance of the cured product of the resin blend.

The following examples and comparative examples are provided for the purpose of further illustrating the composition of the present invention. In the examples and comparatives, all parts were based on weight.

EXAMPLE 1

An epoxy resin (102 parts) prepared by heating 100 parts of a bisphenol A type epoxy resin (GY-260 of Ciba Geigy) and 0.5 part of a phenoxy resin (PKHH of Union Carbide Corporation) to form a uniform liquid mixture, 95 parts of a condensation product of 65 parts of methyl-THPA (acid anhydride) and 30 parts of bisphenol A, 1 part of zinc octylate and 510 parts of an alumina powder were agitated at 60° C. under vacuum so as to prepare an epoxy resin composition. The initial viscosity of the resin composition, its pot life, gelling time and time vs. viscosity profile were determined by the following methods. The results are summarized in the following Table 1 and the accompanying FIGURE (- -).

Three test pieces were prepared from the resin composition by first gelling it at 150° C. and by then curing at 130° C.×24 hr. These test pieces were used in evaluation of crack resistance, HDT and filler precipitation, respectively, by the methods shown below. The results of evaluation are also summarized in Table 1.

(Initial viscosity)

The epoxy resin composition was agitated at 60° C. for 40 minutes and its viscosity was measured.

(Pot life)

The viscosity of the epoxy resin composition was measured at 60° C. and at intervals of 30 minutes. The time required for the viscosity to increase to $5 \times 10^4$ cp was measured.

(Gelling time)

The epoxy resin composition was put in a vessel held at 150° C. and heated in a separate oil bath held at 150° C. The time required for the resin composition to gel was measured.

(Time vs. viscosity profile)

The epoxy resin composition was put in a vessel held at 60° C. and the vessel was placed in an oil bath also held at 60° C. Viscosity measurement was done at 30-min intervals for plotting the time-dependent variations in viscosity.

(Crack resistance)

A test piece of the epoxy resin composition was examined for its carck resistance by the method recommended by the International Electrical Commission in International Electrical Commission Publication 455-2.

(Deflection temperature under flexural load)

A test piece was prepared from the epoxy resin composition and evaluated in accordance with ASTM-D 648.

(Filler precipitation)

A test piece was sampled from the cured product of the epoxy resin composition and its resistance to filler precipitation was evaluated by the incineration method. The amount of filler precipitation was determined by subtracting the measured value of filling (wt %) from the theoretical value (wt %).

TABLE 1

| | Resin composition | | | Cured product | | filler |
|---|---|---|---|---|---|---|
| Run No. | initial viscosity (cp) | pot life (hr) | gelling time (min) | crack index | HDT (°C.) | preci- pitation (wt %) |
| Ex. | | | | | | |
| 1 | 12,000 | ≧5 | 15 | 8 | 115 | −3.8 |
| 2 | 15,000 | ≧5 | 17 | 12 | 110 | −2.4 |
| 3 | 18,000 | ≧5 | 19 | 16 | 105 | −1.0 |
| Comp. Ex. | | | | | | |
| 1 | 20,000 | 3 | 20 | 4 | 95 | −16 |
| 2 | 15,000 | 3 | 18 | 3 | 105 | −20 |

EXAMPLE 2

An epoxy resin (106 parts) prepared by heating 100 parts of a bisphenol A type epoxy resin (GY-260 of Ciba Geigy) and 5 parts of a phenoxy resin (PKHH of Union Carbide Corporation) to form a uniform liquid mixture, 95 parts of the same condensation product as used in Example 1, 1 part of zinc octylate and 520 parts of an alumina powder were agitated under vacuum to prepare an epoxy resin composition. The characteristics of this composition and the cured product thereof were evaluated as in Example 1. The results are summarized in Table 1 and the accompanying FIGURE (-Δ-).

EXAMPLE 3

An epoxy resin (110 parts) prepared by heating 100 parts of a bisphenol A type epoxy resin (GY-260 of Ciba Geigy) and 10 parts of phenoxy resin (PKHH of Union Carbide Corporation) to form a uniform liquid mixture, 95 parts of the same condensation product as used in Example 1, 1 part of zinc octylate and 530 parts of an alumina powder were agitated under vacuum to prepare an epoxy resin composition. The characteristics of this composition and the cured product thereof were evaluated as in Example 1. The results are summarized in Table 1 and the accompanying FIGURE (-□-).

COMPARATIVE EXAMPLE 1

A hundred parts of a bisphenol-modified epoxy resin (CY-225 of Ciba Geigy), 80 parts of a curing agent (HY 225, i.e., a modified acid anhydride of Ciba Geigy) and 460 parts of an alumina powder were agitated at 60° C. under vacuum so as to prepare an epoxy resin composition. The characteristics of this composition and the cured product thereof were evaluated as in Example 1. The results are summarized in Table 1 and the accompanying FIGURE (- -).

COMPARATIVE EXAMPLE 2

A hundred parts of a bisphenol-modified epoxy resin (CY-225 of Ciba Geigy), 95 parts of a curing agent (23% methyl THPA incorporated in the curing agent used in Comparative Example 1) and 500 parts of an alumina powder were agitated at 60° C. under vacuum so as to prepare an epoxy resin composition. The characteristics of the composition and the cured product thereof were evaluated as in Example 1. The results are summarized in Table 1 and the accompanying FIGURE (- -).

In Examples 1 to 3 and Comparative Examples 1 and 2, the filler occupied 44% by volume of the epoxy resin composition. The amount of the curing agent used per equivalent amount of the epoxy resin was 1 in Examples 1-3, 0.7 in Comparative Example 1 and 0.9 in Comparative Example 2.

As is shown by the above data, the epoxy resin composition of the present invention has reactivity and curing properties that are optimal for the purpose of casting by the superatmospheric gelling method. One particular advantage of the composition is that it has minimum chance of experiencing filler precipitation during casting operations. Other advantages of the composition are its high resistance to heat and thermal shock, as well as its high storage stability resulting from prolonged pot life at low temperatures. A casting may be formed from this epoxy resin composition, with loss of the resin during casting operations being minimized to ensure substantial saving of the resources.

What is claimed is:

1. An epoxy resin composition which comprises an epoxy resin prepared by mixing under heating 100 parts by weight of an epoxy resin having an epoxy equivalent of 200 or below with 0.5–10 parts by weight of a phenoxy resin having Formula (I):

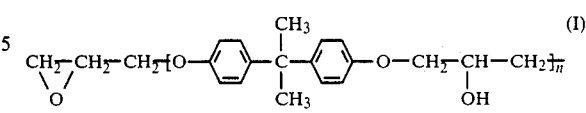

-continued
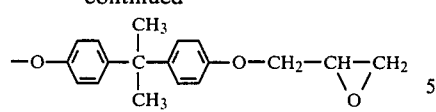
where n is approximately 100; a curing agent; and an inorganic filler;
wherein the curing agent is a condensation product of 100 parts by weight of a polybasic carboxylic acid anhydride and 40-60 parts by weight of bisphenol A having Formula (II):
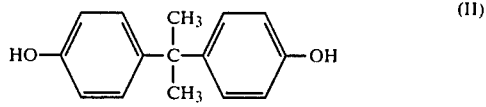
2. An epoxy resin composition according to claim 1 wherein the inorganic filler is an alumina powder.
* * * * *